(12) United States Patent
Hermanns

(10) Patent No.: US 11,723,473 B2
(45) Date of Patent: Aug. 15, 2023

(54) CHAIR GUIDE

(71) Applicant: goracon engineering gmbh, Steinfurt (DE)

(72) Inventor: Ralf Hermanns, Nordwalde (DE)

(73) Assignee: goracon engineering gmbh, Steinfurt (DE)

( * ) Notice: Subject to any disclaimer, the term of this patent is extended or adjusted under 35 U.S.C. 154(b) by 368 days.

(21) Appl. No.: 17/049,043

(22) PCT Filed: Aug. 20, 2019

(86) PCT No.: PCT/EP2019/072290
§ 371 (c)(1),
(2) Date: May 18, 2021

(87) PCT Pub. No.: WO2020/038955
PCT Pub. Date: Feb. 27, 2020

(65) Prior Publication Data
US 2023/0210265 A1    Jul. 6, 2023

(30) Foreign Application Priority Data
Aug. 24, 2018 (DE) .................. 10 2018 006 696.8

(51) Int. Cl.
*A47B 83/02* (2006.01)
*E04H 1/12* (2006.01)
(Continued)

(52) U.S. Cl.
CPC ............. *A47C 15/004* (2013.01); *A47B 83/02* (2013.01); *A47B 83/023* (2017.08);
(Continued)

(58) Field of Classification Search
CPC ... A47B 83/02; A47B 83/0215; A47B 83/023; A47B 2200/0071; E04H 1/12; A47F 10/00
(Continued)

(56) References Cited

U.S. PATENT DOCUMENTS 1,412,254 A * 4/1922 Meyer ............ A47F 10/06
186/42
3,881,574 A * 5/1975 Grange .......... A47F 10/00
186/57
(Continued)

FOREIGN PATENT DOCUMENTS

CN    109090838 A * 12/2018 ............ A47B 39/02
DE    20 2013 005 988       9/2013
(Continued)

*Primary Examiner* — Rodney B White
(74) *Attorney, Agent, or Firm* — Gudrun E. Huckett

(57) ABSTRACT

The invention relates to a device (5) for supporting and for movably guiding a chair (6) in a slotted guide (8, 8.1, 8.2), which is provided in a housing (7) and is designed as an elongated hole guide, having a carriage (10) that can be moved in the slotted guide (8, 8.1, 8.2) and supports a chair receptacle (9) of the chair (6). In order to be able to use this device in a more varied manner, according to the invention, the slotted guide (8, 8.1, 8.2) has at least two slotted guide tracks (13, 14), between which an adjustable track switch (12) is provided in order to transfer the chair (6) out of the one slotted guide track (13) into the other slotted guide track (14), and vice versa.

11 Claims, 3 Drawing Sheets

(51) Int. Cl.
*A47F 10/00* (2006.01)
*A47C 15/00* (2006.01)
*A47C 7/00* (2006.01)

(52) U.S. Cl.
CPC .......... *A47B 83/0215* (2017.08); *A47C 7/004* (2013.01); *A47B 2200/0071* (2013.01); *A47F 10/00* (2013.01); *E04H 1/12* (2013.01)

(58) Field of Classification Search
USPC ...................................................... 297/158.1
See application file for complete search history.

(56) References Cited

U.S. PATENT DOCUMENTS

| | | | | |
|---|---|---|---|---|
| 6,375,256 | B1* | 4/2002 | Rais .................. | A47B 83/02 297/157.1 |
| 8,616,628 | B2* | 12/2013 | Beauchamp ......... | A47B 13/088 297/157.1 |
| 10,174,515 | B1* | 1/2019 | Krivens ................ | A47B 83/02 |
| 2006/0283358 | A1* | 12/2006 | Mueller ................ | A47B 21/00 108/50.01 |
| 2016/0051047 | A1* | 2/2016 | Natuzzi .................... | B60P 3/36 297/65 |

FOREIGN PATENT DOCUMENTS

| EP | 1 530 438 | 5/2005 |
|---|---|---|
| EP | 2 687 129 | 1/2014 |

\* cited by examiner

CHAIR GUIDE

BACKGROUND OF THE INVENTION

The invention relates to a device for supporting and for movably guiding a chair in a slotted guide provided in a housing and embodied, for example, as an elongated hole guide with a carriage that is moveable in the slotted guide and supports a chair receptacle.

Devices for supporting and for movably guiding a chair of the aforementioned kind are used, for example, in assembly halls of public buildings in which the device is recessed, for example, into the hall floor in order to make it possible that the chair position can be changed in relation to a fixedly mounted table. Moreover, devices of the aforementioned kind are known which are furnished such that, in case the chair is not in use, the chair automatically moves into a rest position in which the seat surface is positioned as much as possible below the fixedly mounted table. Accordingly, orderly chair positions are to be automatically adjusted in order to provide adequate passages behind the chair backs of the chairs.

Such chair guides are however suitable also for a further varied use. For example, they can be used in mobile homes, travel trailers, on boats and yachts and other installation rooms in order to position in a first position of use the chairs such in relation to a table that an adequate spacing and an adequate seat position relative to a table can be assumed by persons. In another operating position, for example, during travel of a mobile home or of a boat, it may however be desirable to position the chair in a different position. This is not possible however with known chair guides because, in general, they comprises only one slotted guide that can be moved toward a table or away from this table in order to be able to position the seat surface of the chair in the rest position below the table.

It is object of the present invention to further develop a device for supporting and for movably guiding a chair such that a chair can be transferred into chair positions with which a variation-rich utilization and space utilization in a building and/or in a mobile home, a boat, a yacht and similar installation rooms can be realized.

SUMMARY OF THE INVENTION

As a solution to this object, the device for supporting and for movably guiding a chair of the aforementioned kind is characterized in that the slotted guide comprises at least two slotted guide tracks between which an adjustable switch is provided in order to transfer the chair from one slotted guide track into the other slotted guide track, and vice versa.

In this way, a device for supporting and for movably guiding a chair is made available in which by means of the at least two slotted guide tracks a chair is movable in different directions, preferably is slidable. In this context, the slotted guides can also be oriented angularly relative to each other, for example, at a right angle, so that a chair can be moved along an e.g. rectangular or square table by means of the switch. The switch is preferably an adjustable, in particular rotatable, component with a respective slotted guide or similar elongated hole guide or elongated hole guides that can be oriented in alignment to the slotted guide or an elongated hole guide of the slotted guide track so that a chair can be moved into the corresponding slotted guide of the switch. Subsequently, the switch together with the chair and the chair guide is to be adjusted, in particular to be pivoted, in order to be aligned subsequently with the slotted guide of the neighboring slotted guide track so that the chair together with the chair receptacle can then be moved along the second slotted guide track. In this way, the chairs can be moved and arranged for the most varied utilization concepts. For example, during travel of a mobile home, two chairs can be arranged adjacent to each other in a locked travel position in a slotted guide track in order to be moved in a downtime, e.g. for utilizing a dining area, to an end face of a table. Also, it is possible to change the distances between two neighboring chairs in that extends at the slotted guide track along e.g. a bistro table or a bar counter. The slotted guide tracks can be designed such that, e.g. by means of a removable switch, chair guides and chair guides can be removed from a slotted guide track or can be inserted into them.

BRIEF DESCRIPTION OF THE DRAWINGS

With respect to further important embodiments, reference is being had to further dependent claims, the following description, and the drawing. The drawing shows in:

The drawing uses identical reference characters for identical parts.

DESCRIPTION OF PREFERRED EMBODIMENTS

Figure 1:
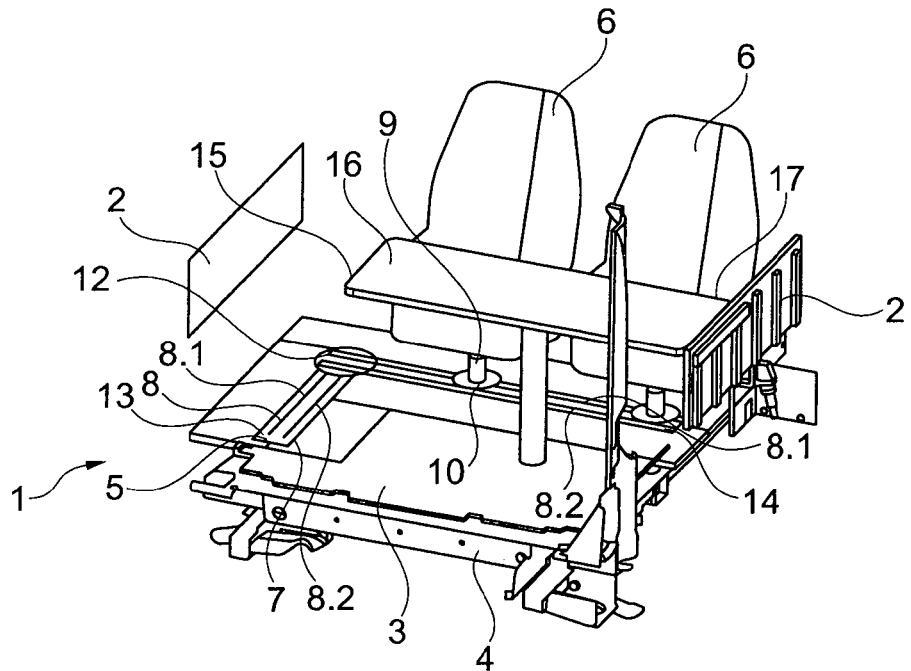
FIG. 1: an embodiment of the device according to the invention, illustrated in an arrangement in a mobile home with two chairs at a rectangular table in first chair guiding positions.
Figure 2:
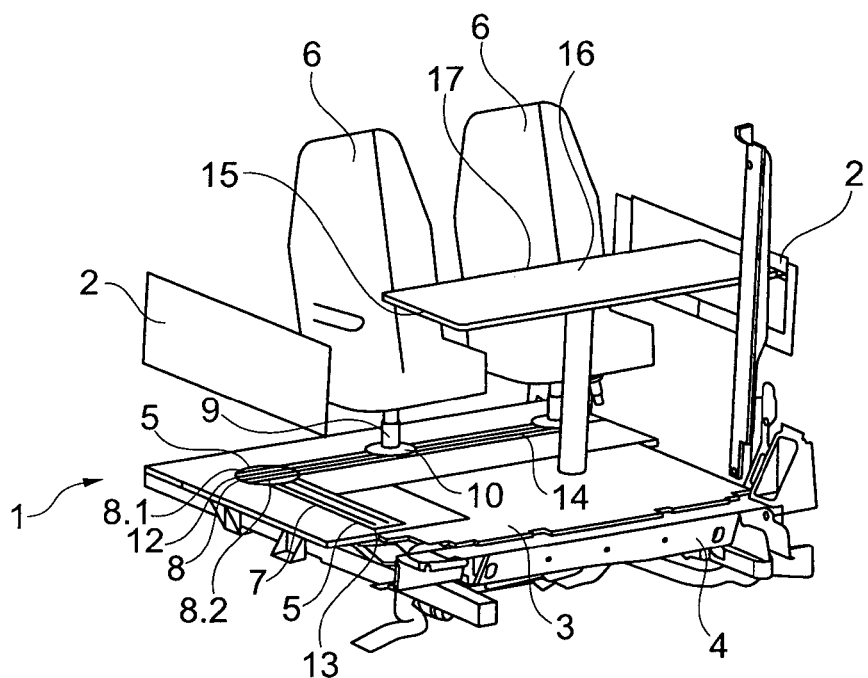
FIG. 2: the embodiment according to FIG. 1 in a different view.
Figure 3:
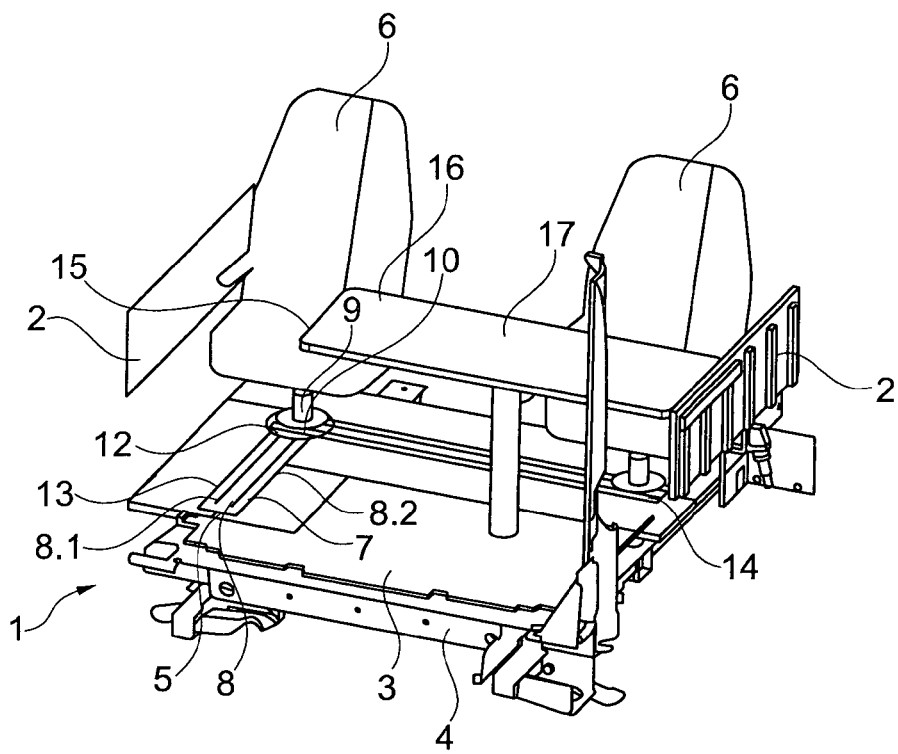
FIG. 3: an illustration of the embodiment according to FIG. 1 analog to FIG. 1 with a chair that has been moved into a switch.
Figure 4:
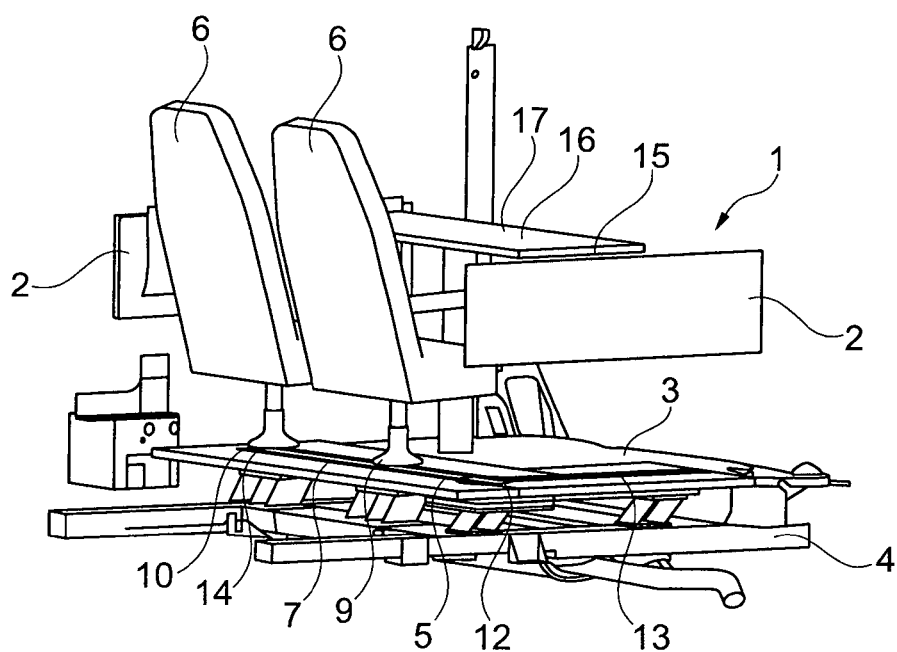
FIG. 4: the embodiment according to FIGS. 1 and 2 in a view at a slant from behind.

The drawings show in general as a whole the receiving space 1, not illustrated, in a mobile home, a building, a boat, a yacht or the like installation room with respective outer walls 2, a floor 3, and a chassis 4 on which the floor 3 is supported. The device 5 for supporting and movably guiding chairs 6 is provided in the floor 3 and comprises a housing 7 with a slotted guide 8 which, in the illustrated embodiment, is comprised of two elongated holes 8.1 and 8.2, which is engaged by a chair receptacle 9 that comprises a carriage 10 by means of which the chair receptacle 9 together with the chair 6 can be moved along the elongated holes 8.1 and 8.2.

A switch 12 is provided between the two slotted guide tracks 13 and 14. The slotted guide tracks 13 and 14 are aligned at a right angle to each other and can be connected mutually by means of the rotatable switch 12.

Figure 5:
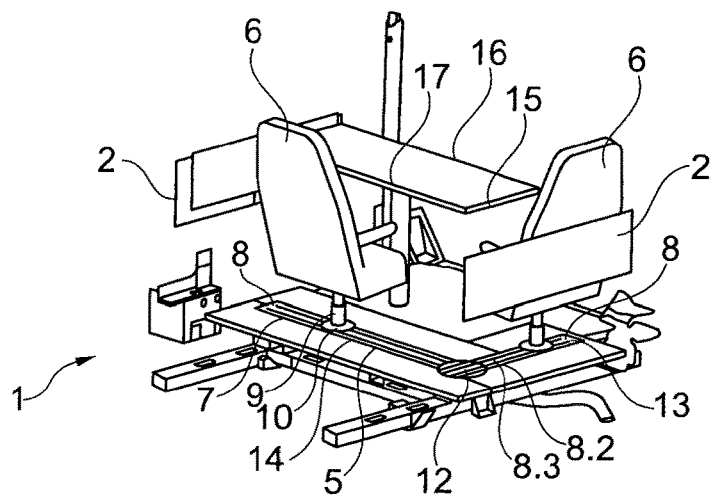
FIG. 5: the embodiment according to FIG. 1 with two chairs of which one is arranged at the longitudinal side of a table and a second one at the end face of a table.
Figure 6:
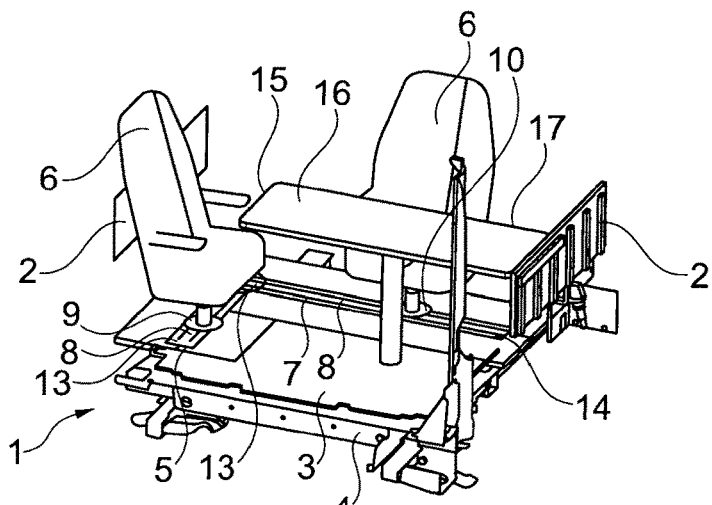
FIG. 6: the embodiment according to FIG. 5 in a different perspective.
Figure 7:
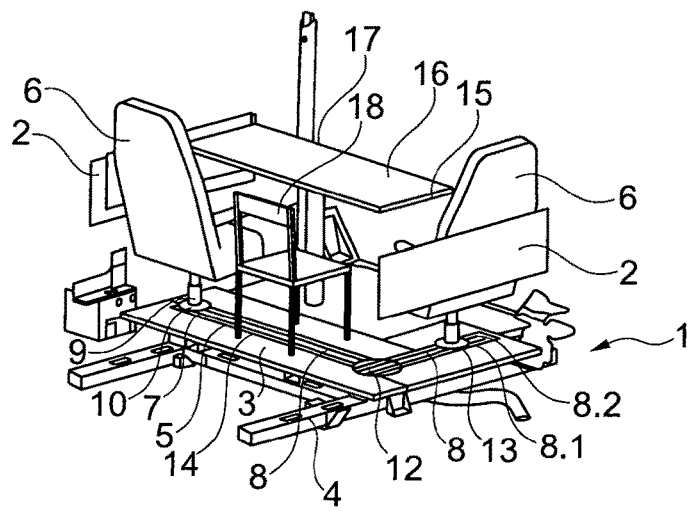
FIG. 7: the embodiment according to FIG. 5 with illustration of a chair additionally arranged therein.

In FIG. 1, a position of the switch 12 is illustrated in which its longitudinal guides are oriented, coaxial to the longitudinal guides 8.1 and 8.2 slotted guide track 14, while in the embodiment according to FIGS. 5, 6, and 7 the switch 12 with its elongated holes is coaxially oriented relative to the elongated holes 8.2 and 8.3 of the slotted guide 13 at the end face 15 of the table 16 and no longer oriented relative to the longitudinal side 17 of the table 16.

The adjustment of the switch 12 can be done manually but also by a motor, for example. Moreover, securing means are provided in order to lock the respective chair 6 in each position. This includes that the chair can also be locked at the switch 12.

Due to the slotted guide tracks 13 and 14, of which also more than two can be provided, a variation-rich positioning of chairs 6 is possible, namely, depending on the application situation or operating state of the installation room 1, be it in solid buildings or be it in movable installation rooms such as in travel trailers, mobile homes, yachts and the like. As illustrated in FIG. 7, due to the movability of the chairs 6 in the slotted guide tracks 13 and 14, the possibility is also provided to accommodate an additional chair 18, as illustrated in FIG. 7.

What is claimed is:

1. A device comprising:
    a housing comprising a slotted guide comprising slotted guide tracks, wherein each slotted guide track is an elongated hole guide;
    a carriage supported in the slotted guide, the carriage configured to support a chair receptacle configured to receive a chair and the carriage further configured to movably guide the chair receptacle in the slotted guide;
    an adjustable switch, wherein the slotted guide tracks include a first slotted guide track and a second slotted guide track, wherein the adjustable switch is arranged between the first and the second slotted guide tracks and is configured to transfer the chair receptacle from the first slotted guide track into the second slotted guide track and from the second slotted guide track into the first slotted guide track.

2. The device according to claim 1, wherein the first and the second slotted guide tracks are angularly positioned relative to each other.

3. The device according to claim 2, wherein the first and the second slotted guide tracks are positioned at a right angle relative to each other.

4. The device according to claim 1, wherein the switch comprises a slotted guide arranged coaxially to the first slotted guide track in a first operating position and arranged coaxially to the second slotted guide track in a second operating position.

5. The device according to claim 4, wherein the elongated hole guides of the slotted guide tracks each comprise two elongated holes arranged at a first distance to each other, and wherein the slotted guide of the switch comprises two elongated holes arranged at a second distance to each other, wherein the first and second distances are identical.

6. The device according to claim 1, wherein the switch is rotatably supported.

7. The device according to claim 1, wherein the switch is lockable in operating positions thereof.

8. The device according to claim 1, wherein the chair receptacle together with a chair received in the chair receptacle is movable via the switch from the first slotted guide track into the second slotted guide track and the chair, together with the chair receptacle and the switch, is pivotable from a first position into a second position.

9. The device according to claim 1, wherein the chair receptacle together with a chair received in the chair receptacle is movable via the switch from the second slotted guide track into the first slotted guide track and the chair, together with the chair receptacle and the switch, is pivotable from a first position into a second position.

10. The device according to claim 1, wherein the housing and the switch are planar with a floor of an installation room in which the device is installed.

11. The device according to claim 10, wherein the installation room is provided in a building, a mobile home, a travel trailer, a boat, or a yacht.

\* \* \* \* \*